United States Patent [19]
Sonderegger

[11] Patent Number: 5,893,118
[45] Date of Patent: Apr. 6, 1999

[54] METHOD FOR MANAGING GLOBALLY DISTRIBUTED SOFTWARE COMPONENTS

[75] Inventor: Kelly E. Sonderegger, Santaquin, Utah

[73] Assignee: Novell, Inc., Provo, Utah

[21] Appl. No.: 786,918

[22] Filed: Jan. 22, 1997

Related U.S. Application Data

[63] Continuation of Ser. No. 576,647, Dec. 21, 1995, Pat. No. 5,761,499.

[60] Provisional application Nos. 60/000,200, Jun. 14, 1995 and 60/003,615, Sep. 12, 1995.

[51] Int. Cl.$^6$ ................................................... G06F 17/00
[52] U.S. Cl. ........................ 707/203; 707/200; 707/204
[58] Field of Search .................................. 707/203, 204, 707/200

[56] References Cited

U.S. PATENT DOCUMENTS

| | | | |
|---|---|---|---|
| 4,558,413 | 12/1985 | Schmidt et al. | 707/203 |
| 4,580,218 | 4/1986 | Raye | 364/300 |
| 5,265,250 | 11/1993 | Andrade et al. | 395/650 |
| 5,287,505 | 2/1994 | Calvert et al. | 395/600 |
| 5,341,478 | 8/1994 | Travis, Jr. et al. | 395/200 |
| 5,349,642 | 9/1994 | Kingdon | 380/25 |
| 5,412,772 | 5/1995 | Monson | 395/155 |
| 5,499,358 | 3/1996 | Nevarez | 395/600 |
| 5,542,086 | 7/1996 | Andrew et al. | 395/600 |
| 5,550,976 | 8/1996 | Henderson et al. | 396/200.06 |
| 5,553,139 | 9/1996 | Ross et al. | 380/4 |
| 5,553,143 | 9/1996 | Ross et al. | 380/25 |
| 5,553,282 | 9/1996 | Parrish et al. | 395/600 |
| 5,608,903 | 3/1997 | Prasad et al. | 395/610 |
| 5,659,735 | 8/1997 | Parrish et al. | 707/10 |
| 5,675,802 | 10/1997 | Allen et al. | 395/703 |
| 5,678,039 | 10/1997 | Hinks et al. | 707/4 |

FOREIGN PATENT DOCUMENTS

| | | | |
|---|---|---|---|
| 87107964 | 12/1987 | European Pat. Off. | G06F 9/46 |

OTHER PUBLICATIONS

"CORBA 2.0/IIOP Specification PTC/96–08–04", Anon., *Object Management Group*, Mar. 4, 1996, Selected Pages.

"Distributed Object System Framework ORB", K. Seki et al., *NEC Research & Development 35 No. 3*, Jul. 1994, pp. 292–297.

"Environment, Virtual Machine, Class Loaders", Anon., *from Marty Hall's Java Page*, Date Unknown, pp. 1–7.

"Executing C++ Programs in a Distributed Environment", C.–Q. Yang et al., *International Journal of Mini & Microcomputers 13 No. 3*, 1991, pp. 139–143.

"Get Ready For Web Objects", S. Steinberg, *Wired*, Feb. 1996, pp. 104–107.

"Java Developers Guide", J. Jaworski, *Sams.net*, 1996, pp. 559–575, 641–646.

"The Java™ Programming Language", K. Arnold et al., *Addison Wesley Publishing Company, Inc.*, 1996, pp. 247–251.

(List continued on next page.)

*Primary Examiner*—Thomas G. Black
*Assistant Examiner*—Donald Min
*Attorney, Agent, or Firm*—Computer Law++

[57] ABSTRACT

Methods and systems are provided which make security, licensing, and browsing capabilities of directory services available for use with the Java language and environment, and thus provide an alternative to security restrictions imposed on Java applets. A Java component type is created in a directory services schema. The Java component type specifies where a Java class can be found in a LAN or on the Internet. The key attributes of the Java component type are its common name (specifying a Java class) and either a reference to the file containing the Java class's byte codes or a binary stream attribute containing the byte codes. The loadClass( ) method is extended to look for Java classes within a directory services database. The directory services features thus made available include support for securing, metering, and licensing individual Java classes.

29 Claims, 6 Drawing Sheets

OTHER PUBLICATIONS

"Microsoft to Woo Internet Programmers", D. Clark et al., *The Wall Street Journal,* Dec. 7, 1995, p. B4.

"The Lotus Notes™ Storage System", K. Moore, *ACM SIGMOD Record 24, 2,* 1995, pp. 427–428.

Brockschmidt, Inside OLE, Second Edition, Microsoft Press (1995), pp. 9–22, 33–35, 43–47, 58, 59, 65–73, 169–72, 226–37, 247, 268–74, 277–301, 328–38, 378–80, 616, 617, 667–69, 830–33, 879, 988, 989, 1126, 1127, 1145–64.

OLE 2 Programmer's Reference, vol. One, Microsoft Press (1994), pp. 3–29.

Krol, The Whole Internet, User's Guide & Catalogue, O'Reilly & Associates (1992), pp. 187–322.

Bierer et al., Netware 4 for Professionals, New Riders Publishing (1993), pp. 255–342.

"Lotus's Open Messaging Interface", RELease 1.0, vol. 91, No. 9, (Sep. 30, 1991), pp. 3(5).

"Over in the DOS/Windows World", RELease 1.0, vol. 91, No. 8, (Aug. 31, 1991), p. 13(1).

METHOD FOR MANAGING GLOBALLY DISTRIBUTED SOFTWARE COMPONENTS

RELATED APPLICATIONS

This application is a continuation of commonly owned U.S. patent application Ser. No. 08/576,647, now U.S. Pat. No. 5,761,499 filed Dec. 21, 1995, for a Method for Managing Globally Distributed Software Components, and on that application's underlying patent provisional application Nos.: 60/000,200, filed Jun. 14, 1995 and 60/003,615 filed Sep. 12, 1995.

FIELD OF THE INVENTION

The present invention relates to a computer-implemented method for managing software components in a computer network, and more particularly to a method for locating, loading, securing, licensing, or metering Java™ classes which reside on a local network or on the Internet.

TECHNICAL BACKGROUND OF THE INVENTION

Modern information technology provides a vast array of software items to meet many different needs. However, after a need is identified, the sheer volume of available technology makes locating suitable items difficult. Systems or the items they provide may duplicate the functionality of other systems or items. Different pieces of software often behave inconsistently. Accessing and using items is difficult because items are often available only through systems that are not compatible with the system on which the items would be used.

Furthermore, accessing items through the Internet, though tremendously useful, is inherently unsafe and unreliable at present. A location that was uninfected yesterday may be virus-ridden or simply unavailable today. It is difficult to ensure that a virus, a snoop, or other undesired software has not been embedded in or substituted for a component. It is also difficult to track use of components for license and accounting purposes, so there is less commercial incentive to make Internet software library servers continually available and secure.

As used herein, "Internet server," "Internet client" and like terms refer to a computer that is identified by an Internet address. Internet addresses are discussed in E. Krol, *The Whole Internet: User's Guide and Catalog,* second edition, ISBN 1-56592-063-5 ("Internet Guide"), pages 23–34.

One approach to reducing these problems relies on the applet feature of the Java™ programming language and environment. (JAVA is a trademark of Sun Microsystems, Inc.) The Java language and environment are described in *The Java™ Programming Language,* by Ken Arnold and James Gosling, ISBN 0-201-63455-4 ("Java Programming Language") and in other commercially available books, CD-ROMs, Web sites and the like. A wide variety of Java software components, Java browser controls, Java automation objects, and related tools are commercially available.

The Java programming language supports miniature application programs called "applets" that are executed while users view World Wide Web pages. Applets are linked or included in Web pages through HTML, much as images and links to other pages are included. When a user selects the highlighted or underlined portion of the Web page that corresponds to the applet, "byte codes" corresponding to the applet are transferred across the Internet to a Java interpreter in the user's Web browser. The Java interpreter "interprets" the applet byte codes by translating them one (or a few) at a time into binary code that can be executed on the user's computer, executing the binary code, translating the next byte code(s), and so on. Thus, a given applet may run on any machine on which a Java interpreter is available, without any need for revision of the applet by a programmer.

To provide security, however, applets labor under a number of restrictions. Applets are forbidden to read from or write to the local user's hard drive. They are not allowed to read system properties, to run programs, to load dynamic link libraries, or to establish network connections with any site except the site from which the original applet was downloaded.

Programmers will immediately appreciate the difficulties raised in trying to write useful programs that cannot freely access the disk, RAM, and other system resources. The problems inherent in restricting network connectivity are somewhat subtler but also severe. As noted, applets can only look at and download from the site where the applet was originally located. This was designed as a security feature in that the Web site the applet came from is deemed secure, while all other sites are presumed to be insecure. But there is nothing inherently secure about a location just because an applet was downloaded from it.

These severe restrictions are enforced at least in part by the Web browser and its interpreter; applets are not designed to run as stand-alone programs. The applet only displays to a local screen area. The Web browser and/or the interpreter filter out any byte codes in the applet that read from the local disk, write to the local disk, or in general, do anything that leaves permanent results in a client computer's storage medium. In some interpreters, the security features can be disabled, but this makes the client system vulnerable to viruses and the other problems noted above.

The byte codes in applets and other Java programs are organized into "classes" which define "methods" (similar to procedures or functions in other programming languages), "objects" (which are instances of classes), and/or "interfaces" (which declare methods but do not implement them). Java classes, methods, objects, and interfaces are familiar to those of skill in the art.

Only locally loaded classes are available to Java clients; a list of the loaded classes is kept in a local hash table by the computer that loaded the classes. Classes that an applet or Java program or its classes refers to are loaded as needed, unless doing so violates one of the Java security restrictions. An applet or a Java class "refers to" a class definition when it contains a class definition, is capable of reading and/or writing a field that is defined by a class definition, and/or is capable of invoking a method that is defined by a class definition. Java applets, Java applications, and Java classes all refer to Java class definitions. These Java concepts are discussed at length in Java Programming Language and\or other commercially available references.

A given class may be used in many applets or stand-alone Java programs. However, the present Java language and environment provide no well-established way to license and charge for uses of individual classes. For example, if a class were "checked out" of a class library by a user for 16 minutes, ideally 16 minutes of access at a rate suitable for that class would be billed.

Similarly, there is no well-established way to ensure that a user has a valid license for an individual Java class. For example, if a company has a 100-person site license for a given class, a warning or refusal or surcharge would ideally be presented when the $101^{st}$ concurrent user from that company requests the class.

A tool that has not previously been used in managing Java classes is known as a "directory services provider." Directory services providers vary but in general they help administer both the location of network resources and the rights of network users to use those resources. One well-known directory services provider includes NetWare Directory Services ("NDS") software commercially available from Novell, Inc. of Orem, Utah (NETWARE DIRECTORY SERVICES and NDS are trademarks of Novell, Inc.).

The directory services provider includes a schema. The schema includes a set of "attribute syntax" definitions, a set of "attribute" definitions, and a set of "database object class" definitions. The NDS software and a default NDS schema are described in Bierer et al., *NetWare 4 for Professionals,* ISBN 1-56205-217-9 ("NetWare 4"), pages 255–342. The terms "attribute" and "property" are used interchangeably in NetWare 4 and herein, as are the terms "attribute syntax" and "property syntax."

Each attribute syntax in the schema is specified by an attribute syntax name and the kind and/or range of values that can be assigned to attributes of the given attribute syntax type. Attribute syntaxes include, without limitation, Case Exact String (case-sensitive string), Case Ignore List (case-insensitive string), E-Mail Address, Net Address (valid addresses include IPX and AppleTalk), Path, and Stream (to access data not stored directly in NDS database files). Attribute syntaxes correspond roughly to data types such as integer, float, string, file, stream, or Boolean in conventional programming languages.

Each attribute in the schema has certain information associated with it. Each attribute has an attribute name and an attribute syntax type. The attribute name identifies the attribute, while the attribute syntax limits the values that are assumed by the attribute. For instance, the default NDS schema includes an attribute of syntax type integer having the name "supported connections" which specifies the number of concurrent connections a file server allows.

Each attribute may also have associated with it any or all of the following flags: Non-removable, Hidden, Public Read, Read Only, Single-Valued, Sized, and String. The general meanings of these flags are familiar to those of skill in the art. If the Sized flag is set for a given attribute, then upper and lower bounds (possibly including No Limit) are imposed on values currently held by that attribute.

Each database object class in the schema also has certain information associated with it. Each database object class has a class name which identifies it, a set of super classes that identifies the other classes from which this class inherits attributes, and a set of containment classes that identifies the classes permitted to contain instances of this class.

Each database object class also has a container flag and an effective flag. The container flag indicates whether the class is a container class, that is, whether it is capable of containing instances of other database object classes. The effective flag indicates whether instances of the class can be defined. Non-effective database object classes are used only to define attributes that will be inherited by other classes, whereas effective classes are used to define inheritable attributes, to define instances, or to define both.

In addition, each database object class groups together certain attributes. The naming attributes of a database object class are those attributes that can be used to name instances of the class. The mandatory attributes of a database object class are those attributes that must exist in each valid instance of the class and/or become mandatory attributes of classes which inherit from the class. The optional attributes of a database object class are those attributes that may, but need not, exist in each valid instance of the class. Optional attributes of a parent class become optional attributes of a child class which inherits from the parent class, unless the attributes are mandatory in some other parent class from which the child inherits, in which case they are also mandatory in the child.

A database object is an instance of a database object class. Different database objects of the same class have the same mandatory attributes but may have different current values in their corresponding mandatory attributes. Different database objects of the same class may have different optional attributes, and/or different current values in their corresponding optional attributes.

NDS database object classes do not necessarily correspond in a one-to-one manner with Java classes, nor do NDS database objects necessarily correspond one-to-one with Java objects. It is unfortunate but nonetheless true that words such as "class" and "object" are widely used to mean different things even by programmers who are talking about computer programs and the like.

The directory services provider also includes a directory services interface library which provides access to the schema and to a database. The schema is an API-extensible schema in that the attributes and object classes found in the schema can be altered through an Application Programmers' Interface ("API") without direct access to the source code that implements the schema. In some embodiments the directory services interface library includes tables or commands stored in a file which is read by the schema during its initialization and when database objects are created, thereby defining the available attributes and classes.

In addition or as an alternative, the directory services interface library includes a set of routines that are available to other code to access and modify the schema. One implementation of the directory services interface library includes an NWDSxxx( ) library that is commercially available from Novell, Inc. of Orem, Utah. The NWDSxxx( ) library is so named because the names of functions and data types defined in the library typically begin with "NWDS," an acronym for "NetWare Directory Services." It would be a straightforward task for one of skill in the art to access the NWDSxxx( ) library from a Java program or a Web browser.

The directory services database contains database objects that are defined according to the schema and the particulars of the network. These objects typically represent resources of the network. The database is a "hierarchical" database because the objects in the database are connected in a hierarchical tree structure. Objects in the tree that can contain other objects are called "container objects" and must be instances of a container object class.

The database is also a "synchronized-partition" database. The database is typically divided into two or more non-overlapping partitions. To improve the response time to database queries and to provide fault-tolerance, a replica of each partition is physically stored on one or more file servers in the network. The replicas of a given partition are regularly updated by the directory services provider through an automated synchronization process, thereby reducing the differences between replicas caused by activity on the network.

Other network administration tools which the Java environment fails to utilize are NWAdmin and its possible "snap-in" modules. The descriptions of these tools in commonly owned application Ser. No. 08/499,711, filed Jul. 7, 1995 now U.S. Pat. No. 5,692,129, issued on Nov. 25, 1997 are incorporated herein by reference.

Thus, it would be an advancement in the art to provide a novel method for managing Java classes which are distributed in a computer network.

It would be an additional advancement to provide such a method which takes advantage of the security and licensing capabilities of directory services providers.

Such a method for managing software components is disclosed and claimed herein.

BRIEF SUMMARY OF THE INVENTION

The present invention provides methods and systems that merge complementary capabilities of directory services and of the Java language and environment. The invention provides an alternative to Java applet security restrictions.

According to one method of the invention, a Java component type is created in a Novell directory services schema. The Java component type specifies where a Java class can be found in a LAN or on the Internet. The key attributes of the Java component type are its common name (specifying a Java class) and a Universal Naming Convention ("UNC") reference to the file containing the Java class's byte codes and other contents. The loadClass( ) method is extended to look for Java classes within the directory services database.

In another embodiment, a new directory services Java component type is also created, but the key attributes are the Java class common name and a binary stream attribute. The binary stream contains the Java class's byte codes and other contents. Multiple classes may be stored in the stream by "zipping" them together with a utility such as the PKZIP tool. Like the first embodiment, this embodiment requires a lookup capability that is implemented as an extension of the Java ClassLoader class.

Software components that can be represented thus in the directory services database include applets, Java classes, and pieces of software that refer to applets or Java classes. All the features of Novell's directory services become available for locating, securing, metering, and licensing individual Java classes or groups of classes or applets or programs. The severe restrictions imposed by applets can be replaced by the more flexible and well-established security features of NDS.

Other features and advantages of the present invention will become more fully apparent through the following description.

BRIEF DESCRIPTION OF THE DRAWINGS

To illustrate the manner in which the advantages and features of the invention are obtained, a more particular description of the invention summarized above will be given with reference to the attached drawings. These drawings only provide selected embodiments of the invention and are not therefore to be considered limiting of its scope. In the drawings.

DETAILED DESCRIPTION OF THE PREFERRED EMBODIMENTS

The present invention relates to a method and apparatus for locating, loading, securing, licensing, and/or metering packages, classes, or other software components. Suitable software components include Java classes. As noted, Java classes may be, but are not required to be, invoked by a Java applet.

The software components reside on a computer network such as a local network, wide area network, and/or the Internet; as noted above "Internet" as used herein includes variations such as a "private Internet," "secure Internet," "value-added network," or "intranet." The computers connected by the network may be workstations, laptop computers, disconnectable mobile computers, file servers, or a combination thereof. The network may include one or more LANs, wide-area networks, Internet servers and clients, intranet servers and clients, or a combination thereof.

Figure 1:
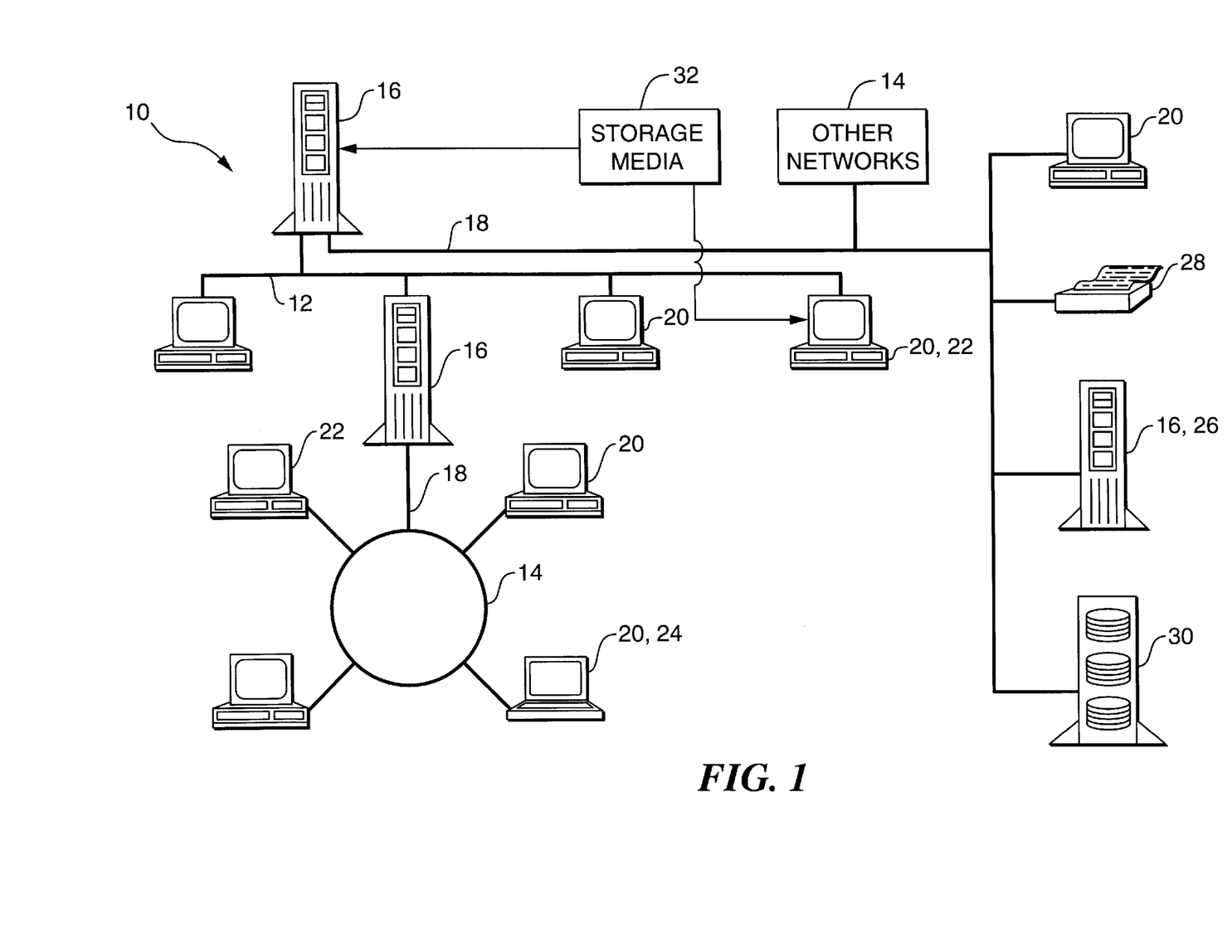
FIG. 1 is a diagram illustrating a computer network suitable for use with the present invention.

One of the many computer networks suited for use with the present invention is indicated generally at 10 in FIG. 1. In one embodiment, the network 10 includes Novell NetWare® network operating system software (NETWARE is a registered trademark of Novell, Inc.) and Novell's NetWare Directory Services software. In alternative embodiments, the network includes NetWare Connect Services, VINES™, Windows NT™, Windows 95™, LAN Manager™, or LANtastic™ network operating system software and an implementation of a distributed hierarchical partitioned object database according to the X.500 protocol (VINES is a trademark of Banyan Systems™; NT, WINDOWS 95™, and LAN MANAGER™ are trademarks of Microsoft™ Corporation; LANTASTIC is a trademark of Artisoft™). The network 10 may include a local area network 12 which is connectable to other networks 14, including other LANs or portions of the Internet or an intranet, through a gateway or similar mechanism.

The network 10 includes several file servers 16 that are connected by network signal lines 18 to one or more network clients 20. The file servers 16 and network clients 20 may be configured by those of skill in the art in a wide variety of ways to operate according to the present invention. The file servers 16 may be configured as Internet servers, as intranet servers, as directory services providers or name servers, as software component servers, or as a combination thereof. The servers 16 may be uniprocessor or multiprocessor machines. The servers 16 and clients 20 each include an addressable storage medium such as random access memory or a non-volatile storage medium such as a magnetic or optical disk.

Suitable network clients 20 include, without limitation, personal computers 22, laptops 24, and workstations 26. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the network 10. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform directory services object and software component management steps of the present invention substantially as described herein.

Figure 2:
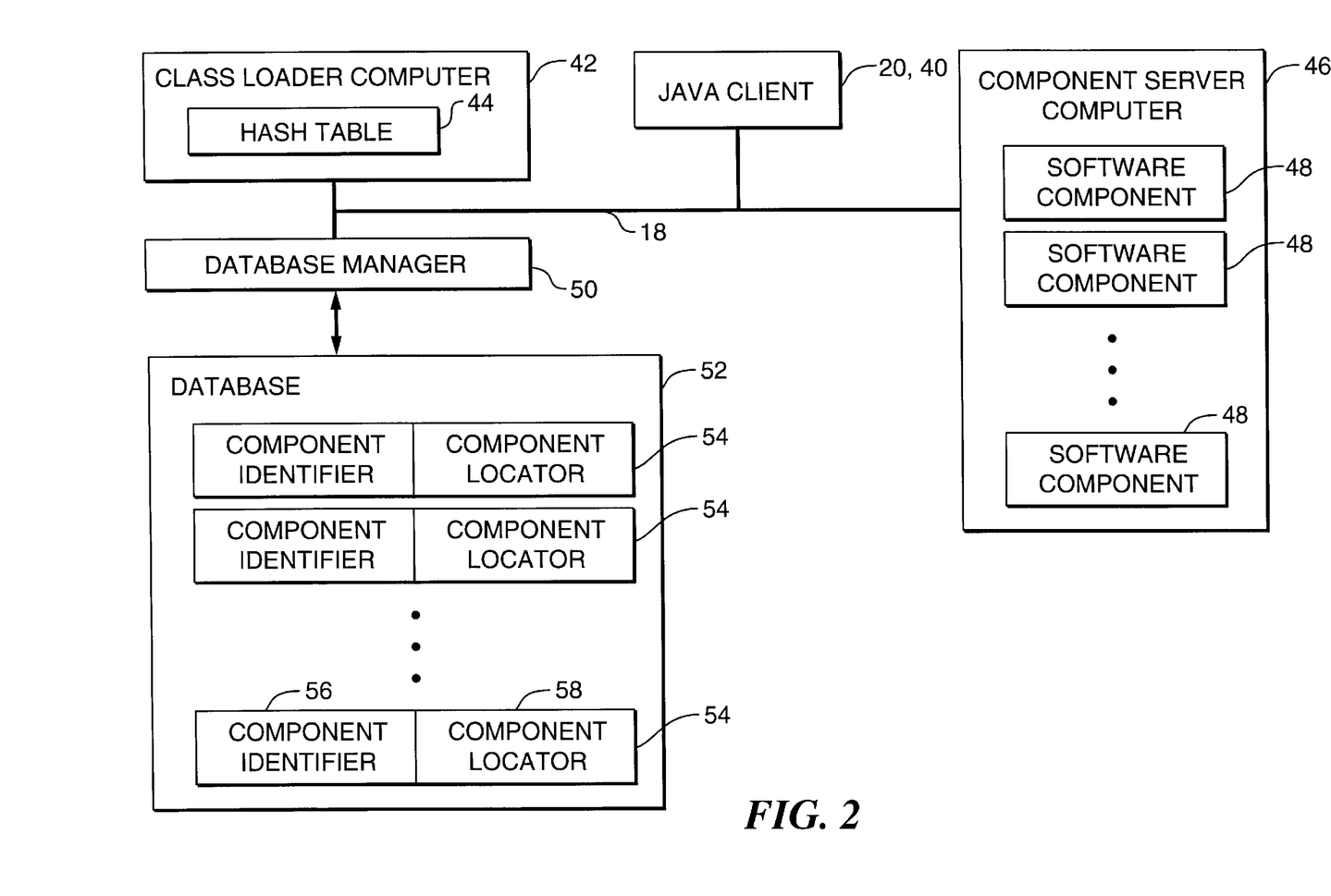
FIG. 2 is a diagram illustrating relationships between a software component client, a software component server computer, a hashtable, and a database according to the present invention.

FIG. 2 illustrates a network configuration in which a network client 20 acts as a Java client 40. That is, some piece of Java-aware software running on the client 40 has identified a particular Java software component whose methods may be investigated and possibly used. Java-aware software includes Web browsers that contain a Java interpreter, stand-alone Java interpreters, and other software capable of browsing, gathering, and/or interpreting Java code in its various forms.

The desired software component is typically identified by one or more of the following: a Java class name, a Java package name, a Universal Resource Locator ("URL"), a server identifier, a volume identifier, and a file path. However, the desired software component may also be identified by a globally unique identifier ("GUID"), a universally unique identifier ("UUID"), or by other means.

The Java client 40 is connected by the network signal means 18 to a hash table computer 42. Alternatively, the client 40 and the hash table computer 42 may be the same computer.

A Java hash table 44 or equivalent structure resides on the hash table computer 42. Suitable structures 44 include hash tables; arrays; lists, including linked lists; binary trees, B-trees, and other trees; stacks; queues; relational database tables; graphs; and other searchable storage structures useful to those of skill in the art for determining whether a particular class or other software component has already been loaded by the class loader computer 42.

As used herein, a file or structure or software component "resides on" a given computer if it is accessible to another computer on the network through the given computer. For instance, files which are managed by a conventional file server such as a NetWare file server reside on that file server.

A component server computer 46 is also connected to the network by the signal means 18. One or more Java software components 48 reside on the component server 46. As noted, only loaded software components are available to Java clients. Thus, any of the components 48 which do not appear in the hash table 44 are not available to the Java client 40, even if the client 40 has access through the network to the files that contain the components 48.

The signal means 18 also connects a database manager 50 to the network. The database manager 50 manages a database 52 which contains one or more database objects or entries 54. As used herein, "database object" refers to a specific kind of "database entry." Each database object or entry 54 associates a component identifier 56 with a component locator 58. In one embodiment, the database manager 50 comprises Novell NDS software and the database 52 comprises an NDS database.

Figure 3:
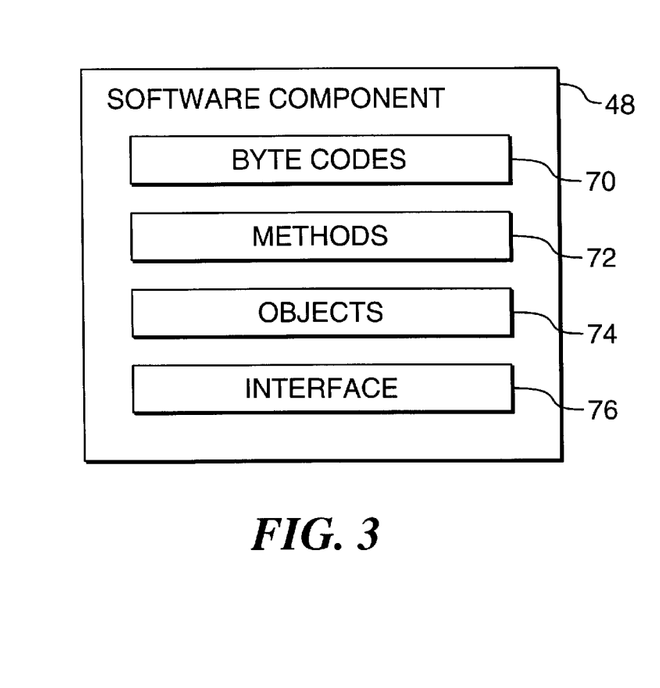
FIG. 3 is a diagram illustrating a software component suitable for use with the present invention.

FIG. 3 further illustrates an embodiment of one software component 48 in the form of a Java component. The Java component 48 includes byte codes 70 capable of being interpreted and executed by a virtual machine in a Java interpreter. Suitable byte codes 70 include, without limitation, those stored in files normally named with a ".class" suffix.

The component 48 may also include one or more methods 72, one or more objects 74, and/or one or more interfaces 76. Methods, objects, and interfaces are discussed in Java Programming Language and other commercially available references on Java.

Figure 4:
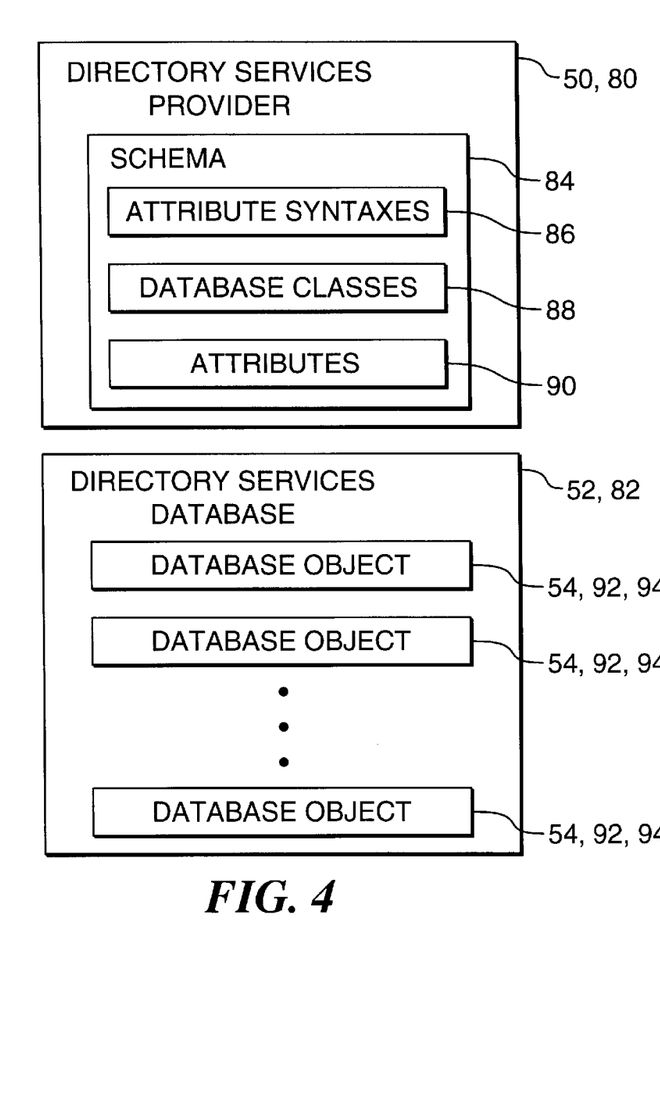
FIG. 4 is a diagram illustrating a directory services provider and database.

FIG. 4 further illustrates an embodiment of the database manager 50 and the database 52. The database manager 50 comprises a directory services provider 80 and the database 52 comprises a hierarchical synchronized-partition database 82 that is maintained by a network operating system or other program. One suitable database 82 comprises an NDS database. One suitable directory services provider 80 comprises Novell NDS software maintained by the NetWare network operating system. NDS provides a schema 84 that contains definitions of attribute syntaxes 86, database classes 88, and attributes 90. One embodiment utilizes the existing NDS schema 84 and simply interprets database values according to the present invention.

As illustrated in FIGS. 2 and 4–6, alternative embodiments according to the present invention extend the NDS schema by defining component database objects such as the objects 92, 94. Each embodiment associates component identifiers 56 with component locators 58 by placing an identifier attribute 96 and a binary locator attribute 98 or 100 in an NDS database object 92 or 94, respectively. In each case, the identifier attribute 96 contains a Java class identifier. Either or both type of database object 92, 94 may be utilized in a given database 82.

Figure 5:
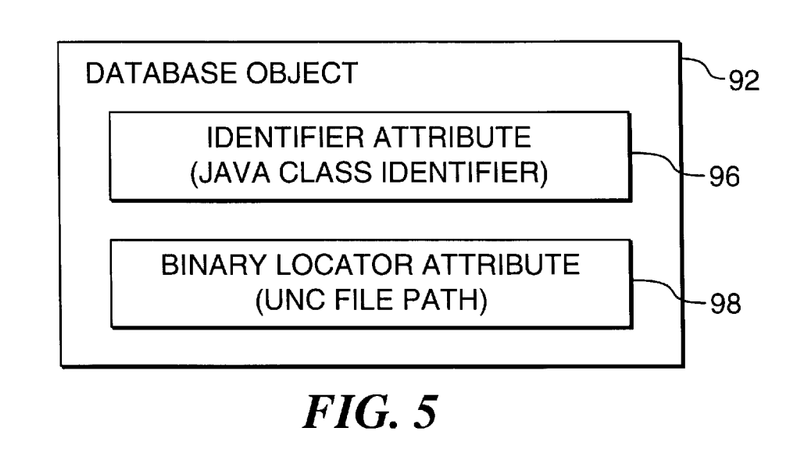
FIG. 5 is a diagram illustrating one embodiment of a component database object according to the present invention.

In the embodiment shown in FIG. 5, the binary locator attribute 98 has a universal naming convention file name as its value. The file name identifies the file system location of the file that contains the byte codes 70 (FIG. 3) of the software component 48 that is identified by the Java class name in the identifier attribute 96 of the database object 92.

Figure 6:
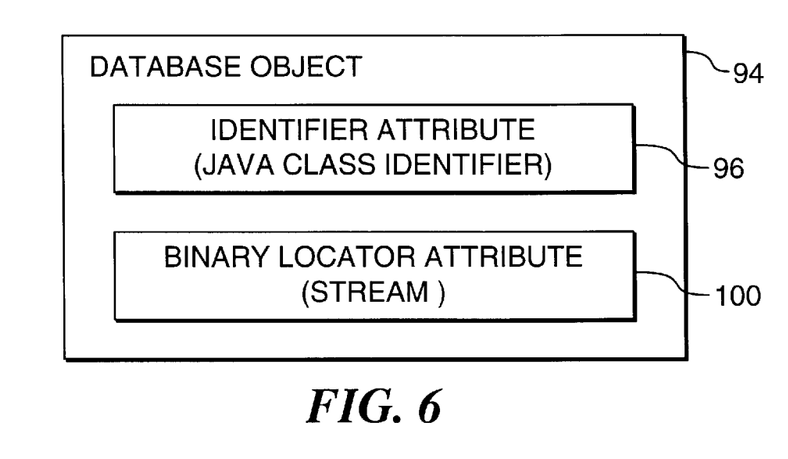
FIG. 6 is a diagram illustrating an alternative embodiment of a component database object according to the present invention.

In the embodiment shown in FIG. 6, the binary locator attribute 100 has a stream as its value. The stream provides direct access to the byte codes 70 (FIG. 3) of the software component 48 that is identified by the Java class name in the identifier attribute 96 of the database object 94. The byte codes 70 in the stream may also correspond to multiple classes (the identifier attribute 96 may be multi-valued) if the byte codes for individual classes are "wrapped" or otherwise aggregated into a format suitable for streaming, such as the familiar *.zip format.

In alternative embodiments of the present invention, the database objects 92, 94 also contain Java descriptor attributes, licensing attributes, attributes which store information that is found in hash table files 44, attributes which store information that is useful in managing NDS databases, or a combination thereof.

Figure 7:
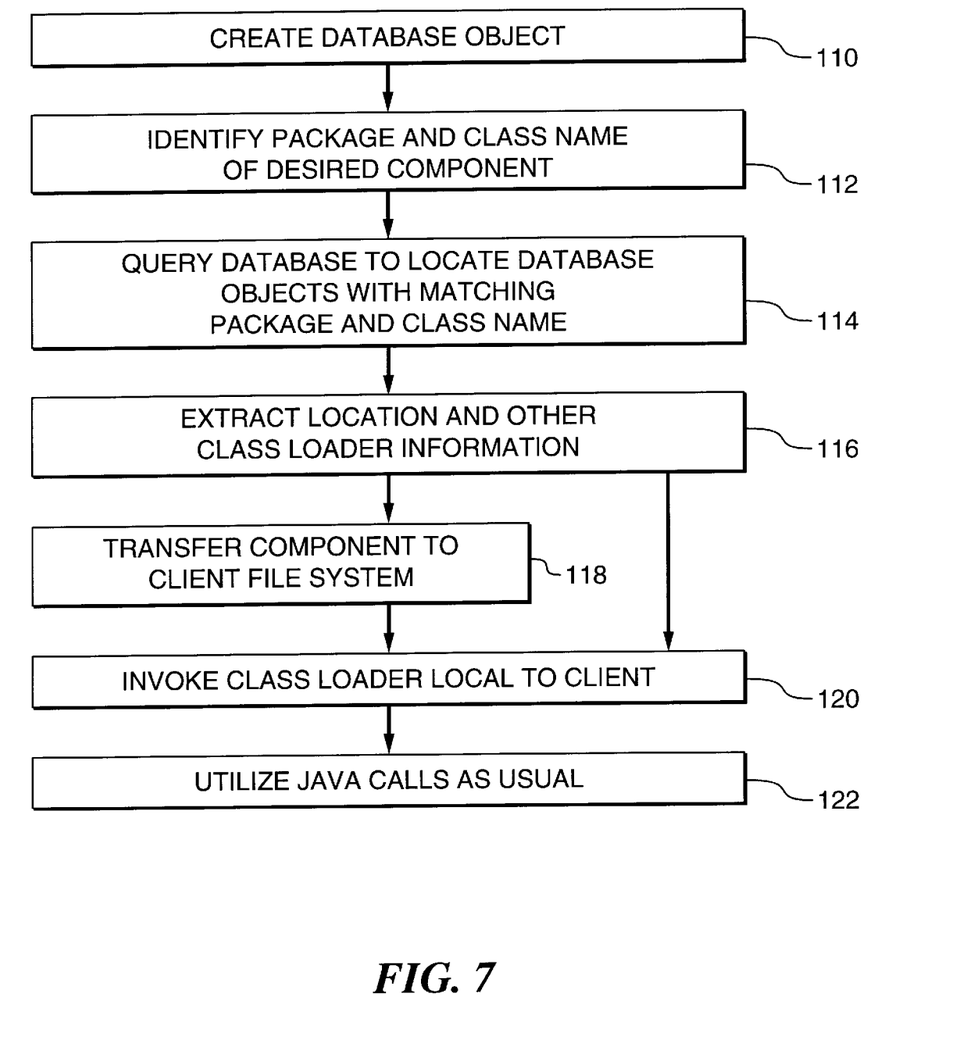
FIG. 7 is a flowchart illustrating a method of the present invention.

FIGS. 4 and 7 illustrate one method according to the present invention. During a creating step 110, a database entry or object 54 is created. Suitable database entries and objects 54 associate Java software component identifiers 56 with Java software component locators 58, as illustrated in FIGS. 2 and 4–6. In embodiments which comprise NDS database objects such as the objects 92 or 94, those of skill in the art will readily create such objects through appropriate calls to commercially available NWDSxxx( ) functions and other well-known means.

With reference to FIGS. 2 and 7, during an identifying step 112 the Java client 40 identifies a specific desired Java software component and checks the local hash table 44 to see if the desired component is already loaded. The desired component is identified by one or more of the following: URL, server name, directory path, file name, class name, package name, CLSID, GUID, UUID, and/or an equivalent component identifier or class identifier. If the desired component is found in the structure 44, it is already loaded, and steps 114 through 120 are skipped. In one embodiment, a human user directly initiates steps 114–120 in response to an error message when an attempt is made to use a class that is not already loaded.

In a preferred alternative embodiment, the Java-aware browser or other program is extended so that at least a portion of steps 114–120 is performed automatically by the extended program if the desired component is not yet loaded. This may be accomplished by providing a suitable loadClass( ) method in an extension class of the ClassLoader class. A familiar loadClass( ) method, such as that described in Java Programming Language, is modified as follows:

- loadClass( ) is placed in a class NDSClassLoader which extends ClassLoader;
- NDSClassLoader.loadClass( ) is the method invoked by the Java-aware software;
- NDSCLassLoader.loadClass( ) provides the Java-aware software with access to NDS through an NDS browser, using familiar GUI code with a native code library or a Java library that provides the functionality found in Novell's commercially available NWAdmin utility and/or NWDSxxx( ) library API or the like;
- licensing software queries either the user or configuration information on the network 10 (FIG. 1) to obtain keys or agreements to licensing conditions, and to notify the user that licensing is in effect, and then provides the information NDS requires to enforce license restrictions and manage use metering, before NDS will release the byte codes 70;
- security or access control restrictions imposed by NDS are handled in a manner similar to licensing enforcement, with the necessary information being obtained from the user or login files or the like, and access to the byte codes being denied when a security breach appears likely;
- "glue" software is provided which passes Java class identifiers 96 and locators 98, 100 from the NDS browser to a more familiar portion of the NDSCLassLoader.loadClass( ) method, which then locates the byte codes 70 and loads them using the NDS access library.

The present invention thus extends the reach of the hash table 44; if the desired component is not loaded, a querying step 114 queries the database manager 50. Alternatively, software performing the querying step 114 may access the database 52 directly. Suitable software includes, without limitation, NDS software and Internet search engines. The present invention also uses NDS to enforce access, security, metering, and licensing restrictions. Programmers will appreciate that the steps described above need not be invoked directly from within a loadClass( ) method, but may also be invoked by other methods which coordinate with a less complex and more conventional loadClass( ) embodiment.

In either embodiment, the querying step 114 includes accessing the database 52 and searching it to locate any entries 54 which contain the desired component's identifier. If no database entry or object 54 corresponding to the specified Java component identifier is located by the search, the Java client 40 is informed. The client 40 must then proceed as best it can without the desired class.

However, if the search succeeds, one or more database entries or objects 54 containing the desired component identifier are selected. The associated location of the desired component's byte codes 70 (FIG. 3) is determined by extracting it from the database entry or object 54 during an extracting step 116. Extraction is accomplished by means familiar to those of skill in the art.

The extracting step 116 may include extraction of licensing information, such as the value of a licensing attribute kept in a component database object 92 or 94. Steps may then be performed to ensure that licensing requirements will be met. Depending on the circumstances, suitable steps include offering the user a license agreement, initiating usage metering, debiting an existing account, or taking other steps familiar to those of skill in the art of licensing software.

During a transferring step 118, any necessary transfer of the desired component over the network to make it reside on the Java client 40 is performed. If the desired component already resides on the Java client 40 but was unavailable because it had not yet been loaded, no transfer is made.

A portion of the transferring step 118 varies according to the details of the database object 54 used. Streams such as those specified in the binary locator attribute 100 (FIG. 6) are opened as streams, a temporary file residing on the Java client 40 is created, and the stream data is transferred over the network into the temporary file. Files specified in the binary locator attribute 98 (FIG. 5) are copied or moved, as the user specifies, with copying being the preferable default.

During an updating step 120, the hash table 44 that resides on the Java client 40 is updated to reflect the loading of the desired software component. In some embodiments, a predetermined value or flag is included in the hash table entry to permit easy identification of entries made according to the present invention. This value facilitates removal of such entries, as well as making it easy for system administrators to obtain statistics regarding use of the present invention.

Finally, during a utilizing step 122, the hash table information and then the desired software component itself are utilized by the Java client. This is accomplished in a manner well-known in the art.

Figure 8:
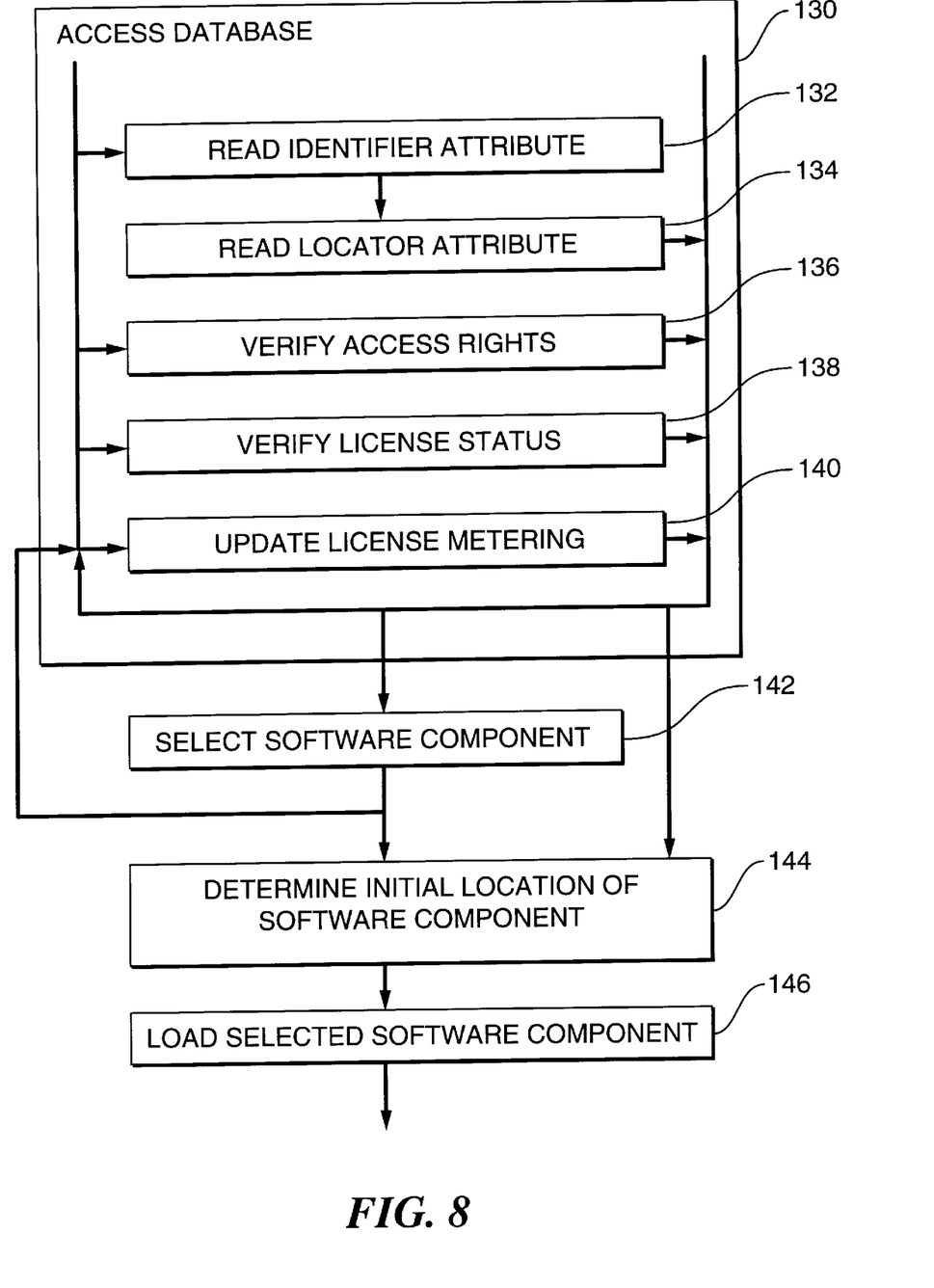
FIG. 8 is a flowchart illustrating another method of the present invention.

FIG. 8 also illustrates a method of the present invention. During an accessing step 130, browsing software accesses a database such as the database 52 (FIG. 2) which associates software component identifiers 56 with software component locators 58. The accessing step 130 may include a reading step 132 to read the identifier 56 and a reading step 134 to read the locator 58, if the browsing identifies a component of interest, or the accessing step 130 may not look beyond textual descriptions and the like, if no components are sufficiently interesting to be loaded.

The accessing step 130 may also include steps 136, 138, and 140, which verify access rights, verify license status, and update license metering, respectively. For instance, the access verifying step 136 enforces read, write, and permission-granting privileges based on the user's identity, group membership, location, or other criteria. Details of such security enforcement are well-known in the art; the main point to be made here is that the current invention makes the security enforcement mechanisms of NDS available on a component-by-component basis to protect the integrity and secrecy of individual Java classes. As a result, security is based on well-understood criteria, such as whether one is a system administrator or not, rather than being based on blanket restrictions like those imposed on Java applets.

Likewise, the license status verifying step 138 can enforce license restrictions, such as the maximum number of concurrent users, on a component-by-component (e.g., per Java class) basis, providing finer granularity than enforcement mechanisms that treat an entire program or library as the smallest unit that can be licensed. The metering step 140 can similarly note the starting time and ending time of use of an individual Java class, allowing charges for use of software components to more accurately reflect the actual use, thereby encouraging use of Java classes.

The method also includes a step 142 of selecting a software component which is identified in the database as a result of the accessing step 130. Selection can be accomplished using a familiar GUI, or can be performed automatically by a Java-aware program which is seeking a particular class or a class having predetermined characteristics. As indicated in FIG. 8, security or licensing steps 136, 138, and/or 140 may be performed either before or after a component is selected, depending on the method of operation desired in a given embodiment.

After a component has been selected, its current (initial) location is determined during a step 144. This may be accomplished by reading the locator attribute 98, 100 (FIGS. 5, 6). Alternatively, the location of a component may be considered when deciding whether to select the component during the step 142.

Finally, the selected software component is loaded onto the class loader computer 42 (FIG. 2) during a step 146. This may be accomplished using a loadClass( ) method as discussed above. Indeed, many of the mechanisms and means used to accomplish the steps shown in FIG. 7 may also be readily used by those of skill to accomplish the steps shown in FIG. 8.

In summary, the present invention provides a novel approach which effectively extends the scope of Java software component repositories beyond a local computer or file system to the networks that communicate with the local computer. These communicating networks may be other local area networks, wide area networks, or even the worldwide Internet. Widespread use of software components, subject to appropriate licensing and security restrictions, is thereby promoted. Embodiments of the present invention are fully compatible with existing Java hash table files, and they eliminate the need for ad hoc approaches that require multiple (possibly inconsistent) copies of hash tables or fail to scale well to many LANs.

All descriptions identified herein by citing specific topics or pages in Java Programming Language, Internet Guide, and NetWare 4 are incorporated herein by reference. In the event of a conflict, descriptions provided directly herein take precedence over those incorporated by reference.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method for managing software components in a network of computers, each software component referring to at least one class definition, the network including at least one class loader computer capable of loading such a software component, the network also including at least one component server computer distinct from the class loader computer, the method comprising the steps of:

accessing a synchronized-partition database which associates software component identifiers with software component locators;

selecting a software component which is identified in the database as a result of the accessing step;

determining an initial location of the software component selected during the selecting step, the initial location being outside the synchronized-partition database; and loading the selected software component onto the class loader computer.

2. The method of claim 1, wherein the software component selected during the selecting step comprises a Java software component.

3. The method of claim 1, wherein the accessing step comprises accessing a hierarchical synchronized-partition database maintained by a network operating system.

4. The method of claim 3, wherein the accessing step further comprises reading an identifier attribute value and reading a locator attribute value.

5. The method of claim 4, wherein the identifier attribute value corresponds to a Java identifier and the locator attribute value corresponds to a universal naming convention file path.

6. The method of claim 4, wherein the identifier attribute value corresponds to a Java identifier and the locator attribute value corresponds to a stream containing a Java software component.

7. The method of claim 1, wherein the accessing step comprises accessing a directory services database.

8. The method of claim 1, wherein the selecting step comprises selecting a software component that resides on an Internet server.

9. The method of claim 1, wherein the selecting step comprises selecting a software component that resides on a World Wide Web server.

10. The method of claim 1, wherein the loading step is preceded by the step of transferring at least a portion of the selected software component over the network to a client computer.

11. The method of claim 10, wherein the transferring step comprises transferring from a location specified by a hypertext markup language link.

12. The method of claim 10, wherein the transferring step comprises transferring from a location specified by a Universal Resource Locator.

13. The method of claim 1, wherein the accessing step comprises verifying access rights on a per-component basis.

14. The method of claim 1, wherein the accessing step comprises verifying license status on a per-component basis.

15. The method of claim 1, wherein the accessing step comprises updating license metering information on a per-component basis.

16. A method for managing Java classes in a network of computers, the network including at least one class loader computer capable of loading a Java class, the network also including at least one class server computer distinct from the class loader computer, the method comprising the steps of:

accessing a hierarchical synchronized-partition database which associates Java class identifiers with Java class locators;

selecting a Java class which is identified in the database as a result of the accessing step;

determining an initial location of the Java class selected during the selecting step; and     loading the selected Java class from the class server computer onto the class loader computer.

17. The method of claim 16, wherein accessing comprises verifying access rights to an individual Java class.

18. The method of claim 16, wherein accessing comprises verifying the license status of an individual Java class.

19. The method of claim 16, wherein accessing comprises updating license metering information for an individual Java class.

20. A computer storage medium configured by storage therein of a directory services database object, the database object corresponding to a software component in a network of computers, each software component referring to a Java class, the database object capable of residing in a hierarchical, synchronized-partition database and having a plurality of attributes, each attribute having a name, a syntax, and a current value, the syntax limiting the values assumed by the attribute, the plurality of attributes comprising an identifier attribute having a current value which identifies a Java software component, and a locator attribute having a current value corresponding to the location of the Java software component.

21. The storage medium of claim 20, wherein the locator attribute has a stream attribute syntax.

22. The storage medium of claim 20, wherein the locator attribute has a string attribute syntax.

23. The storage medium of claim 20, wherein the plurality of attributes further comprises a licensing attribute.

24. The storage medium of claim 20, wherein the attributes are defined by a NetWare Directory Services schema.

25. The storage medium of claim 20, wherein the Java software component is an individual Java class.

26. A system for managing Java classes in a network of computers, the system comprising:

a class loader computer capable of loading a Java class;

a class server computer connected to the class loader computer by a network connection;

means for accessing a hierarchical synchronized-partition database which associates Java class identifiers with Java class locators;

means for selecting a Java class which is identified in the database as a result of the accessing step;

means for determining an initial location of the Java class selected during the selecting step; and     means for loading the selected Java class from the class server computer onto the class loader computer.

27. The system of claim 26, further comprising means for verifying access rights to an individual Java class.

28. The system of claim 26, further comprising means for verifying the license status of an individual Java class.

29. The system of claim 26, further comprising means for updating license metering information for an individual Java class.

\* \* \* \* \*